US005730771A

United States Patent [19]

Terneu et al.

[11] Patent Number: 5,730,771
[45] Date of Patent: Mar. 24, 1998

[54] METHOD OF MANUFACTURING A CORROSION RESISTANT PYROLYTICALLY COATED GLASS

[75] Inventors: Robert Terneu, Thiméon; Michel Hannotiau, Jodoigne, both of Belgium

[73] Assignee: Glaverbel, Brussels, Belgium

[21] Appl. No.: 205,365

[22] Filed: Mar. 3, 1994

[30] Foreign Application Priority Data

Mar. 5, 1993 [GB] United Kingdom ............ 9304575

[51] Int. Cl.$^6$ .................................................. C03C 17/28
[52] U.S. Cl. ...................... 65/60.5; 65/60.52; 65/111; 427/314; 427/168; 427/226; 427/421
[58] Field of Search .................... 65/30.1, 60.1, 65/60.3, 60.5, 60.52, 111, 430, 413, 443; 427/314, 168, 226, 421, 165

[56] References Cited

U.S. PATENT DOCUMENTS

| | | |
|---|---|---|
| 3,647,531 | 3/1972 | Matsushita et al. . |
| 3,833,399 | 9/1974 | Martyn et al. . |
| 4,232,062 | 11/1980 | Okino et al. . |
| 4,259,371 | 3/1981 | Postupack et al. ............ 427/314 |
| 4,323,598 | 4/1982 | Okino et al. . |
| 4,521,454 | 6/1985 | Kandachi et al. . |
| 4,687,687 | 8/1987 | Terneu et al. . |
| 4,694,218 | 9/1987 | Chao . |
| 5,348,805 | 9/1994 | Zagdoun et al. . |

FOREIGN PATENT DOCUMENTS

| | | |
|---|---|---|
| 751917 | 8/1970 | Belgium . |
| 0374754A1 | 6/1990 | European Pat. Off. . |
| 0433915A1 | 6/1991 | European Pat. Off. . |
| 0465309A1 | 1/1992 | European Pat. Off. . |
| 53-124523 | 10/1978 | Japan . |
| 54-24 | 1/1979 | Japan . |
| 3-126643 | 5/1991 | Japan . |
| 1397741 | 6/1975 | United Kingdom . |
| 2069475 | 8/1981 | United Kingdom . |
| 2150044 | 6/1985 | United Kingdom . |
| 2174412 | 11/1986 | United Kingdom . |
| 2185249 | 7/1987 | United Kingdom . |
| 2208874 | 4/1989 | United Kingdom . |
| 2248243 | 4/1992 | United Kingdom . |
| 2275691 | 9/1994 | United Kingdom . |
| 85/05292 | 12/1985 | WIPO . |

*Primary Examiner*—Steven P. Griffin
*Attorney, Agent, or Firm*—Spencer & Frank

[57] ABSTRACT

A method of manufacturing a metal oxide coated glass which is a glass substrate bearing a pyrolytically formed coating composed of at least two metal oxides and which has a corrosion resistance at least equal to 5 as determined by Applicants' defined transmission test, the method including contacting a hot glass substrate with a coating precursor material composed of a tin-containing material and a titanium-containing material in the presence of oxygen to form a metal oxide coating composed of at least two metal oxides including tin oxide and titanium oxide on the hot glass substrate by pyrolyzing the coating precursor material as it contacts the hot glass substrate, wherein the titanium-containing material comprises a titanium chelate which is a reaction product of octyleneglycol titanate and acetylacetone.

13 Claims, No Drawings

METHOD OF MANUFACTURING A CORROSION RESISTANT PYROLYTICALLY COATED GLASS

BACKGROUND OF THE INVENTION

1. Field of the Invention

This invention relates to a glass substrate bearing a pyrolytically formed coating comprising at least two metal oxides, and to a method of pyrolytically forming a coating comprising at least two metal oxides on a hot glass substrate by contacting the substrate with coating precursor material in the presence of oxygen.

The invention has particular and specific reference to glass bearing a reflective coating or a solar screening coating such as a coating containing tin oxide and titanium oxide, but is not limited thereto.

2. Description of the Related Art

British Patent Nos. 2 150 044 and 2174412 (Glaverbel) describe incorporating in a titanium dioxide coating a proportion of tin oxide, in particular at least 30% by weight tin and at least 30% by weight titanium, measured as the oxides. The presence of tin provides a means of increasing the physical thickness of the resulting coating, without increasing its optical thickness (as compared with a coating consisting solely of titanium oxide) so that the abrasion resistance of the coating can be increased while controlling its colour in reflection.

These and other examples of coated glass substrates may suffer to a greater or lesser extent from problems of low corrosion resistance, especially on direct long-term exposure to the atmosphere, and especially with varying climatic conditions. Reactions with gaseous components of the atmosphere, such as sulphur dioxide, may lead to a loss of optical properties or a separation of the coating from the glass.

SUMMARY OF THE INVENTION

We have now surprisingly discovered that the corrosion resistance of glass substrates bearing pyrolytically formed coatings comprising tin oxide and titanium oxide can be improved.

According to a first aspect of the invention, there is provided a glass substrate bearing a pyrolytically formed coating comprising at least two metal oxides, characterised in that such coating comprises tin oxide and titanium oxide and the coated substrate has a corrosion resistance, as determined by the "transmission" test described herein, at least equal to 5.

The coating obtained is resistant to corrosion, even after thermal tempering.

In order to determine the corrosion resistance of coated substrates according to the invention, it is necessary to carry out a first test, referred to herein as the "transmission" test and preferably also a second test, referred to herein as the "coating separation" test.

In the "transmission" test, a 10 cm×10 cm sample is immersed in a horizontal orientation, with the coated face of the sample uppermost, in a bath of 8M hydrochloric acid at a temperature of 63° C. for 20 minutes. Mild agitation is carried out during this time, with the use of a rotational stirrer, sufficient to cause continuous renewal of the liquid at the liquid/solid interface, but insufficient to cause any physical damage to the sample. After the stated time the sample is removed from the acid bath, rinsed and then dried with hot air and its percentage transmission ($t_a$) measured with a Hunter spectrometer using C.I.E. illuminant C. This measurement is compared with a similar measurement made on the sample before immersion in the acid bath ($t_c$) and on the substrate before coating ($t_o$). Using a linear scale based on 8=no change in transmission and 0=transmission increased to that of the un-coated substrate, a value for the "transmission" corrosion resistance is determined. Coated substrates according to the invention have a corrosion resistance according to this test of at least 5, preferably at least 6.

In the "coating separation" test, a 10 cm×10 cm sample is immersed in a horizontal orientation, with the coated face of the sample uppermost, in a bath of 0.16M hydrofluoric acid at a temperature of 20° C. for 10 minutes. Mild agitation is carried out during this time, with the use of a rotational stirrer, sufficient to cause continuous renewal of the liquid at the liquid/solid interface, but insufficient to cause any physical damage to the sample. The condition of the sample is observed after 2 minutes. After 10 minutes the sample is removed from the acid bath, rinsed and then dried with hot air and examined visually. The sample is examined over all of its surface with the exception of the edges, an edge band of 1 cm width being ignored in order to ignore any edge effects which may not be representative of the corrosion resistance of the coated substrate in practice. By visual observation it is possible to determine how much area of the coating has been separated from the glass substrate. A value for "coating separation" corrosion resistance can be determined by reference to the following table.

| grade | start of deterioration (minutes) | total deterioration (minutes) | separation after 10 minutes (% by area) |
|---|---|---|---|
| 0 | less than 2 | less than 10 | 100% |
| 1 | less than 2 | more than 10 | from 40 to 90% |
| 2 | less than 2 | more than 10 | from 10 to 30% |
| 3 | more than 2 | less than 10 | 100% |
| 4 | more than 2 | more than 10 | from 40 to 90% |
| 5 | more than 2 | more than 10 | from 10 to 30% |
| 6 | less than 10 | more than 10 | no separation but a matt appearance |
| 7 | more than 10 | more than 10 | no separation but a slightly matt appearance |
| 8 | more than 10 | more than 10 | no visible change |

In this test the term "deterioration" refers to any change in the appearance of the coating and the start of deterioration includes the start of any modification in the characteristics of reflection, the appearance of blisters or the formation of spots.

Coated substrates according to the invention preferably have a corrosion resistance according to this test of at least 5, most preferably at least 6. That is, after 10 minutes immersion, less than 40% of the examined area shows visible evidence of coating separation, and preferably no separation occurs, although the appearance of the sample may have changed.

The coated glass substrates according to the invention comprise at least two metal oxides. In the context of the present invention, it is assumed that the titanium is present in oxide form. The other metal oxide present is tin oxide, optionally together with oxide(s) of other metals, in particular oxides of aluminium, zirconium and iron ($Fe_2O_3$).

In a solar screening coated glass substrate according to the invention, the substrate is provided with a coating which comprises tin oxide containing titanium.

Advantageously, the tin/titanium coating is formed to a geometrical thickness in the range 30 to 150 nm preferably 30 nm to 60 nm, and most preferably about 50 nm.

This coating may in turn be provided with an outer coating to increase the luminous transmissivity of the coated substrate, such as a thin layer (not exceeding 160 nm, for example about 90 nm) of silica.

According to a second aspect of the present invention, there is provided a method of forming a glass substrate bearing a pyrolytically formed coating comprising at least two metal oxides, characterised in that the coated substrate has a corrosion resistance, as determined by the "transmission" test described herein, at least equal to 5, the method comprising contacting a hot glass substrate with a tin- and titanium-containing coating precursor material in the presence of oxygen, the coating precursor material comprising a titanium chelate being the reaction product of octyleneglycol titanate and acetylacetone.

There are various ways in which such a coating may be formed. The coatings may be formed by chemical vapour deposition. However, in the most preferred embodiments of the invention, a coating precursor solution comprising organo-metallic compounds which readily decompose under pyrolytic coating conditions is sprayed to contact the substrate at a coating station. Such organo-metallic compounds readily decompose under pyrolytic coating conditions to yield a mixed oxide coating which provides the coating with a good corrosion resistance.

We have found that the incorporation of titanium in a pyrolytically formed oxide coating may be achieved in a particularly beneficial manner according to the invention when the titanium-containing coating precursor material comprises a titanium chelate being the reaction product of octyleneglycol titanate and acetylacetone.

A possible reason for the effectiveness of this chelate as a coating precursor material may be its rather high decomposition temperature, about 370° C. This is significantly higher than that of titanium acetylacetonate, previously known for forming coatings containing titanium oxide by pyrolysis, which decomposes below 300° C., and is also rather higher than that of octyleneglycol titanate which decomposes at about 350° C., but which has poor film forming qualities. It is now believed that where a precursor decomposes before contact with the hot glass substrate, the coating is not homogeneously applied to the substrate, and/or does not adhere well thereto, resulting in a product which is affected by haze or is liable to corrosive attack on long-term exposure to the atmosphere.

The titanium chelate also offers advantages over the use of titanium tetra chloride, which is difficult to form into a sprayable liquid and is prone to hydrolysis in air, leading to the formation of hazy coatings.

The titanium chelate is preferably used in solution. The concentration of the solution may be varied to suit different desired coating conditions and thicknesses required.

Advantageously, the solvent is an organic solvent, having a boiling point under atmospheric conditions of above 40° C., preferably above 60° C. in order to prevent premature evaporation of the solution before the precursor liquid contacts the hot glass substrate, thereby ensuring that the resulting coating will be free from haze. There are various organic solvents which may be used having the advantages of readily dissolving the chelate reaction product and having low latent heat of vaporisation so facilitating the pyrolytic reaction. For example, acetic acid can be used.

Alternatively, the solvent is for example a dipolar aprotic solvent. The expression "dipolar aprotic solvent" is used to denote a solvent which is not able to form strong hydrogen bonds with appropriate anions (following the classification of A. J. Parker in "The Effects of Solvation on the Properties of Anions in Dipolar Aprotic Solvents" Quarterly Reviews 16 (1962), p. 163). Thus solvents with dielectric constants greater than 15 and a dipolar moment greater than 3 Debye Units which cannot donate suitably labile hydrogen atoms to form strong hydrogen bonds with an appropriate species are classed as dipolar aprotic solvents, even though they may contain active hydrogen atoms. As examples of suitable dipolar aprotic solvents, the following are cited: dimethylformamide, dimethylacetamide, tetramethylurea, dimethylsulphoxide, acetonitrile, nitrobenzene, ethylene carbonate, tetramethylenesulphone, hexamethylphosphoramide. Particular preference is given to the use of dimethylformamide which is a good solvent for the titanium chelate in view so that chelate can be applied in relatively high concentrations. This means that the volume rate of application of the solution for forming a coating of a given thickness on a given surface area of substrate can be relatively low.

As an example, the solution contains a tin compound which is organic and is preferably selected from tin dibutyldiacetate, tin acetylacetonate, and tin octoate.

The process according to the invention is particularly appropriate for forming coatings containing titanium oxide at rather high deposition rates. Coatings formed by the said process may be much more durable than oxide coatings formed by previously known processes.

Such coatings may in some cases for example be applied to hollow-ware for protecting the contents against the effects of actinic radiation. Such coatings may confer abrasion resistant properties on hollow-ware containers. Such coatings may be applied to glass microbeads for increasing their reflectance, for example for use of the microbeads as filler material for reflective paints.

It is believed, however, that coated flat glass is of greater commercial importance, and it is accordingly preferred that the coating precursor material is caused to contact a flat glass substrate. Such substrate may be a pre-cut sheet of flat glass which has been reheated to permit the in situ pyrolytic coating reaction, but it is preferred that the coating is formed on a still-hot, freshly-formed ribbon of glass as it travels from a ribbon forming machine. A coating station may for example be located near the entrance to a horizontal annealing lehr. The process of the invention may be performed using apparatus of a type known per se, for example apparatus such as is described in Glaverbel's British Patent Specification No 2,185,249.

The ribbon may be a ribbon of drawn glass, but in particularly preferred embodiments of the invention, the coating is formed on a ribbon of freshly-formed float glass. This saves energy in reheating cool glass, for example pre-cut glass sheets, to the temperatures required for the pyrolytic coating reactions to take place, and it tends to ensure that the surface of the glass is in pristine condition for receipt of the coating. The coating station may for example be located between the exit from a glass ribbon forming apparatus and the entrance to an annealing lehr for that ribbon.

Float glass in general has inherently better optical properties than drawn glass because of the fire polishing which it undergoes in the float chamber. A particular advantage of the coating process of the invention when performed on a such a float glass ribbon is that the coating can be formed to a useful thickness on the ribbon at normal float glass production speeds. It will be appreciated that a given float glass production machine is designed to produce glass at an economically optimum rate, usually measured in tonnes per day. There is thus an optimum production speed (ribbon output speed) which depends inter alia on the thickness of the ribbon being produced. It is inconvenient to slow the ribbon speed from that optimum speed simply in order to allow additional ribbon dwell time in a coating station so that a coating of the desired thickness may be built up.

Preferably, the substrate is conveyed forwardly along a path through a coating station and the coating precursor material is discharged into the coating station towards the substrate in at least one downwardly and forwardly or rearwardly directed stream of droplets, there being discharged into the environment above the substrate, in the same forward or rearward direction as the droplet stream, at each of at least two different heights above the substrate path, at least one current of pre-heated gas which flows into contact with the stream of droplets so as to influence their temperature as they travel towards the substrate. This is a very effective way of controlling coating thickness. There is a very efficient heat exchange between such gas streams and the finely divided droplets of coating precursor material. It will usually be desired to ensure that each gas stream heats the droplets so as to increase coating thickness if the precursor material is in solution.

The gas currents at either or any of the different heights may be blown across the full width of the substrate path or through one or more stationary ducts whose effect is felt over only part of the width of that path, or even through a reciprocating duct which is ganged to a reciprocating spray gun.

The temperature of the pre-heated gas current(s) where the gas contacts the droplets may be uniform across the full width of the substrate path. Alternatively, or in addition, such temperature may be varied across the substrate path. It is usual, due to radiant cooling of the substrate, that its side margins will be cooler than its centre portion, so it is usually desirable preferentially to heat the droplets which will contact the side margins of the substrate. Thus in particularly preferred embodiments of the invention, pre-heated gas is discharged from a plurality of ducts which together is supplied to substantially the full width of the substrate path and the gas which is supplied to different ducts or groups of ducts is pre-heated to temperatures which are independently regulated across the width of the substrate path. This allows fine control of the thickness of the coating which is deposited over the width of the substrate, so promoting uniform optical properties of the coating over its whole extent.

In some particularly preferred embodiments of the coating process of the invention, currents of pre-heated gas are discharged across substantially the full width of the substrate path at least two different heights above that path. The adoption of this preferred feature is found to increase the coating yield, that is, the coating thickness in relation to the rate of discharge of coating precursor material and substrate speed.

It is preferred that gas discharged at the lesser height above the substrate path is pre-heated to a temperature which is substantially uniform across the width of that path. The adoption of this feature is also found to promote the formation of a very compact layer on the substrate which affords an increased resistance to abrasion and corrosion.

The titanium-containing coating precursor solution should be used at a temperature of from 40° C. to 60° C. and is sprayed onto the hot glass substrate, which should have a temperature of from 400° C. to 650° C., the higher the temperature of the glass substrate the better the compaction of the formed coating and the higher the corrosion resistance thereof.

Preferred embodiments of the invention will now be described in the following non-limiting example.

DESCRIPTION OF THE PREFERRED EMBODIMENTS

EXAMPLES 1 AND 1A

A solution is prepared containing 60 liters of tin dibutyldiacetate, 120 liters of titanium chelate and 30 liters of dimethylformamide as a solvent. This solution is sprayed at a temperature of about 20° C. through a reciprocating spray head, with a spraying rate of 65 liters per hour, to contact a travelling ribbon of clear (ie not coloured) hot glass of 6 mm thickness while its temperature is about 600° C. in order to form in situ a coating with a geometric thickness of about 50 nm.

The resulting coating is formed of 40% by volume $TiO_2$ and 60% by volume of $SnO_2$. Its degree of reflectivity in the visible spectrum is about 25%.

By way of comparison (Example 1A), a spraying solution was used which contained 60 liters of "titanium acetylacetonate" instead of the 120 liters of titanium chelate so as to spray the same molar quantity of titanium on the glass ribbon. "Titanium acetylacetonate" is the reaction product of tetra isopropyl titanate and acetylacetone, which is believed to be diacetylacetonate diiso-propyl titanate.

The two coated substrates were subjected to the "transmission" and "coating separation" tests described above and the results obtained from a number of samples were as follows.

| Example | "transmission test" | "coating separation test" |
| --- | --- | --- |
| 1 | between 6 and 8 | 8 |
| 1A* | between 0 and 3 | 0 |

*comparative example

What is claimed is:

1. A method of manufacturing a metal oxide coated glass which is a glass substrate bearing a pyrolytically formed coating comprising at least two metal oxides, the method comprising:

a. reacting a mixture consisting essentially of octyleneglycol titanate and acetylacetone in respective amounts which are effective to provide a reaction product which is a titanium-containing material and is a titanium chelate having a decomposition temperature of about 370° C.; and b. contacting a hot glass substrate with a coating precursor material comprised of a tin-containing material and the titanium-containing material in the presence of oxygen to form a metal oxide coating comprised of at least two metal oxides including tin oxide and titanium oxide on the hot glass substrate by pyrolyzing the coating precursor material as it contacts the hot glass substrate.

2. The method according to claim 1, wherein the tin-containing material comprises an organic tin compound.

3. The method according to claim 1, wherein the coating precursor material is a solution of the tin-containing material and the titanium-containing material in a solvent.

4. The method according to claim 3, wherein the solvent is an organic solvent.

5. The method according to claim 4, wherein the solvent is dimethylformamide.

6. The method according to claim 1, wherein the glass substrate is a flat glass substrate.

7. The method according to claim 6, wherein the metal oxide coating is formed on a flat glass substrate which is in motion and which is a ribbon of freshly-formed float glass.

8. The method according to claim 1, wherein the coating precursor material is a solution of the tin-containing material and the titanium-containing material in a solvent and has a temperature ranging from 40° C. to 60° C., and wherein the hot glass substrate is contacted by spraying thereon said coating precursor material.

9. The method according to claim 1, wherein the hot glass substrate has a temperature which is effective to pyrolyze the coating precursor material and which ranges from 400° C. to 650° C.

10. The method according to claim 1, wherein said contacting continues until the metal oxide coating has a thickness ranging from 30 to 150 nm.

11. The method according to claim 10, wherein said contacting continues until the metal oxide coating has a thickness ranging from 30 to 60 nm.

12. The method according to claim 11, wherein said contacting continues until the metal oxide coating has a thickness of about 50 nm.

13. The method according to claim 1, wherein the coating precursor material is a solution having a temperature ranging from 40° C. to 60° C., and wherein the hot glass substrate is contacted by spraying thereon the coating precursor material.

* * * * *